Patented Nov. 1, 1949

2,486,794

UNITED STATES PATENT OFFICE 2,486,794

1-ALKYL-4-(META-HYDROXYPHENYL) - PIPERIDYL-(4)-ALKYLKETONES AND THEIR PRODUCTION

Karl Miescher, Riehen, and Hans Kaegi, Basel, Switzerland, assignors to Ciba Pharmaceutical Products, Incorporated, Summit, N. J., a corporation of New Jersey No Drawing. Application May 7, 1945, Serial No. 592,535. In Switzerland June 25, 1943

7 Claims. (Cl. 260—293)

This application is a continuation-in-part of our copending application, Serial number 530,742, filed April 12, 1944, now Patent 2,486,792.

The object of the present invention is a process of preparing 4-aryl-piperidine-4-alkyl ketones.

These 4-aryl-piperidine-4-alkyl ketones are obtained by causing α-arylated tertiary γ-amino fatty acid nitriles to react with reactive esters of alkylene-1:2-diols in the presence of acid binding agents in one or more steps, converting the nitrile group in the 4-aryl-piperidine-4-carboxylic acid nitriles obtained into a keto group, and, if desired, splitting off at any phase of the reaction radicals which are suitable for being eliminated and are attached to the cyclic nitrogen.

As starting products there are used therefore α-arylated tertiary γ-amino fatty acid nitriles in which the aryl group may be represented, e. g. by a substituted or unsubstituted phenyl or naphthyl group, the substituents being in any position. The aliphatic radical can be straight or branched or even arranged as part of a ring. For example the following compounds can be used: α-phenyl-γ-(methyl-benzyl-amino)-butyric acid nitrile, α-phenyl-γ(dimethyl- or diethylamino)-butyric acid nitrile, α-(benzyl-oxy- or acyloxy-phenyl)-γ-(methyl-benzyl-amino) - butyric acid nitriles, α-(o-anisyl)-γ-(methyl-diphenylmethyl-amino)-butyric acid nitrile, α-(m-anisyl)-γ-dimethylamino-butyric acid nitrile, α-phenyl - γ - (methyl - benzyl-amino) -valeric acid nitrile, α-naphthyl-γ-(dimethyl-amino)-butyric acid nitrile or α-phenyl-α-[o-(methyl-benzylamino) - cyclohexyl]-acetic acid nitrile. The above mentioned starting products are in some instances known or can be obtained in a known manner.

For the reaction with the above nitriles the following reactive alkylene-1:2-diol esters, for example, may be used: ethylene-dibromide, ethylene-chloro-bromide, ethylene-diiodide, propylene-1:2-dibromide, propylene-1:2 - chloro - bromide, butylene-1:2- or 2:3-dibromide, β-chloroethanol-p-toluene-sulfonic acid ester, glycol-dipara-toluene sulfonic acid ester or propane-1:2-diol-di-methane sulfonic acid-ester.

The reaction itself is carried out in the presence of acid binding agents. For this purpose the following can be used: sodium, potassium, lithium, calcium, as such or in a form of their alcoholates, amides, hydrides or hydrocarbons, as e. g., potassium-tertiary butylate, potassium-tertiary amylate, sodium amide, sodium hydride, butyl-lithium, phenyl-sodium or phenyl-lithium. It is advantageous to use inert solvents such as, e. g. ether, benzene, toluene, xylene or hexane and to work in the presence of indifferent gases such as nitrogen. According to the reactivity of the components, the reaction is carried out with cooling, at ordinary temperature or even with heating. It is possible to close the ring in one or more steps.

The nitrile group of the compounds thus obtained may be converted into a keto group. The nitrile group can also be converted into an amide group in known manner either directly or after conversion into the carboxyl group. The obtained piperidines contain a quaternary ring nitrogen atom. They can be converted into such with tertiary nitrogen, for example, by splitting off alkyl halide by heating. The conversion also succeeds easily if there is as a radical attached to the nitrogen, e. g. a mono-, di- or tri-aryl methyl group which can be removed, among others under the influence of catalytically activated hydrogen or by treatment with e. g. acids or by heating. This conversion can moreover be carried out at any desirable phase of the reaction. If the aryl radical of the reaction products contains one or several substituted hydroxyl groups, these can be converted into unsubstituted hydroxyl groups in the usual manner, for example by treatment with glacial acetic hydrohalic acids.

The process is further elucidated by formulae on the basis of the following scheme:

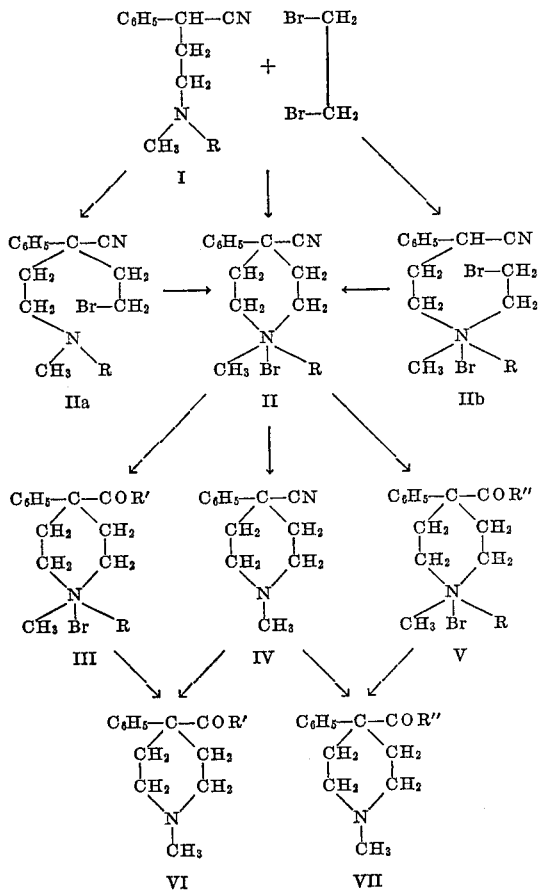

R=hydrocarbon radical capable of being split off
R'=alcohol radical or substituted or unsubstituted amino group
R''=hydrocarbon radical According to the present process a large number of piperidine compounds can be obtained. As a result of the considerable possibilities of variation, numerous new compounds are accessible in addition to known compounds. Of particular interest is the discovery that, for example, the reaction of ethylene-dibromide with a compound of the Formula I according to the above scheme leads pre-eminently to cyclic compounds and not to acyclic ones. It also seems surprising, for example, that the conversion of a compound of the Formula II, in which R represents a hydrocarbon radical capable of being split off, e. g. benzyl, into the compound of the Formula IV under the influence of catalytically activated hydrogen occurs without attacking the nitrile group.

The following examples illustrate the invention, the parts being by weight unless otherwise stated and the relationship of parts by weight to parts by volume being the same as that of the kilogram to the liter.

*Example 1*

52.8 parts of α-phenyl-γ-(methyl-benzyl-amino)-butyric acid nitrile (B. P. 0.1 mm. 153-155- C., prepared from benzyl cyanide and β-chloroethyl-methyl-benzyl-amine in the presence of sodium amide) in 200 parts of ether are added drop by drop while stirring to 10 parts of powdered sodium amide which is suspended under nitrogen in 200 parts of ether. When the reaction is complete, the mixture is stirred for an hour, then 300 parts of ether are added, the whole is cooled with ice and 40 parts of ethylene-dibromide are added. Stirring is then resumed for an hour under ice cooling, for another hour at room temperature and for 4-5 hours by heating to 40° C. A thick suspension of salts is formed. This is decomposed with water and aqueous hydrobromic acid is added until the mixture shows an acid reaction. The 1:1-methyl-benzyl-4:4-phenyl-cyano-piperidinium bromide formed, which is difficultly soluble in water, is precipitated and isolated by filtration with suction and washing with ether and water. It still contains some hydrobromide of the starting product as well as other by-products. For purification the crude bromide is dissolved in the just necessary quantity of boiling water, soda solution is added and the mixture is allowed to cool. The thick mass is thoroughly shaken with ether which dissolves the non-quaternary bases. After filtration with suction and washing with water and ether the remaining salt is recrystallized from the fourfold quantity of boiling water. Thus a good yield of the pure 1:1-methyl-benzyl-4:4-phenyl-cyano-piperidinium-bromide is obtained in two crystalline forms, as glossy flakes and as white aggregates, which cannot be converted into each other and probably represent cis-trans-isomers. The melting point of both bromides is not sharp and lies at about 245 to 260° C.

If the bromide is shaken in aqueous alcoholic solution with hydrogen and palladium black, 1-methyl-4-phenyl-4-cyano-piperidine is formed almost quantitatively from both crystalline forms, in addition to toluene. The 1-methyl-4:4-phenyl-cyano-piperidine can be saponified and esterified with ethanol in known manner to produce 1-methyl-4:4-phenyl-carbethoxy-piperidine.

The same substance is obtained, if the quaternary bromide is heated with sulfuric acid of about 70 to 80 per cent strength, the resulting acid esterified with ethanol and the product subsequently hydrogenated.

*Example 2*

A solution of 52.8 parts of α-phenyl-γ-(methyl-benzyl-amino)-butyric acid nitrile in 200 parts of ether is added drop by drop to 10 parts of powdered sodium amide in 200 parts of ether. After stirring for 1 hour, a solution of 50 parts of propylene-1:2-dibromide in 100 parts of ether is added. The ether slowly reaches its boiling point, the boiling temperature being maintained for 2 hours by external heat. In this reaction only sodium bromide is precipitated and no quaternary salt. On decomposition of the reaction product with water an ethereal and an aqueous layer are obtained which are easily separated. After evaporation of the ether an oil is obtained from the ethereal layer which after prolonged heating on the water bath becomes solid and insoluble in ether. Obviously the formation of the ring of the quaternary bromide occurs only after applying considerable heat. The product is triturated with ether, filtered with suction and thus the 1:1-methyl - benzyl - 2-methyl-4:4-phenyl-cyano-piperidinium bromide is obtained. The product is dissolved without further purification in the tenfold quantity of alcohol of 50 per cent strength and after the addition of about 2 per cent of a platinum catalyst shaken up with hydrogen. When no more hydrogen is absorbed, the whole is filtered with suction, a greater part of the filtrate is evaporated and the residue is rendered alkaline and extracted with ether. On evaporation the ether leaves behind an oil, which boils under a pressure of 0.07 mm. at 107–110° C. This is the 1:2 - dimethyl - 4:4 - phenyl-cyano-piperidine. It can be saponified and esterified according to known methods whereby with the use of ethyl alcohol 1:2 - dimethyl - 4:4 - phenyl-carbethoxy-piperidine is obtained which forms an oil boiling at 105–109° C. under a pressure of 0.15 mm.

As starting product α-(m-nitro-phenyl)-γ-(methyl-benzyl-amino)-butyric acid nitrile, e. g. can also be used and the nitro group in the resulting compounds converted in usual manner into an amino- or a hydroxy group.

The 1:2 - dimethyl - 4:4-phenyl-cyano-piperidine obtained can further be converted in known manner into the 1:2-dimethyl-4-phenyl-piperidine-4-carboxylic acid amide by partial saponification. For the manufacture of amides the obtained nitrile can also be completely saponified, the acid thus obtained converted into the acid chloride by treatment for example with thionyl chloride, and the acid chloride reacted with ammonia or amines. Thus, from the corresponding acid chloride and diethylamine there is obtained 1:2-dimethyl - 4 - phenyl-piperidine-4-carboxylic acid diethylamide.

These amides can also be obtained by converting the above obtained 1:1-methyl-benzyl-2-methyl-4:4-phenyl-cyano - piperidinium bromide into the amides and subsequently splitting off the benzyl group.

*Example 3*

A solution of 65 parts of α-phenyl-γ-(diethylamino)-butyric acid nitrile in 200 parts of absolute ether is added drop by drop to 14 parts of powdered sodium amide in 300 parts of ether. After an hour's stirring 300 parts of ether are added, the mixture cooled with ice and then 60 parts of ethylene-dibromide added. Stirring is carried out for one hour at ice temperature, for another hour at room temperature and for four to six hours at the boiling temperature of the ether. The very consistent reaction mass is separated by filtration with suction washed with ether and dried. 125 parts of a white readily water-soluble salt mixture are obtained which consists, in addition to sodium bromide, chiefly of 1:1-diethyl-4:4-phenyl-cyano-piperidinium bromide. By treating the salt mixture with alcohol, the insoluble sodium bromide contained therein can be eliminated. If the piperidinium bromide or the hydroxide which can be prepared from it, is heated in the vacuum, there is produced by cleavage of ethyl bromide or ethyl alcohol, respectively, the 1-ethyl-4:4-phenyl-cyano-piperidine which is an oil boiling at 110–112° C. under a pressure of 0.05 mm. It can be saponified and esterified in known manner or converted by means of Grignard's compounds into 1-ethyl-4-phenyl-piperidyl-(4)-ketones, such as 1-ethyl-4-phenyl-piperidyl-(4)-ethylketone (oil of boiling point 100° C. under 0.1 mm. pressure).

These ketones can also be obtained if the 1:1-diethyl-4:4-phenyl-cyano - piperidinium bromide is treated with Grignard's compounds and the bromine and one of the ethyl groups are subsequently split off.

*Example 4*

18.8 parts of α - phenyl - γ - (dimethylamino)-butyric acid-nitrile (oil of boiling point 158–160° C. under 17 mm. pressure, obtained from benzylcyanide, β-dimethylaminoethel chloride and sodium amide) are dissolved in 100 parts by volume of ether and allowed to flow into 5 parts of pulverized sodium amide in 80 parts by volume of ether. When the reaction is complete, the whole is cooled to −5° C., 18.8 parts of ethylene-dibromide in 50 parts by volume of ether are added, and the further procedure is as indicated in Example 3. The 1:1-dimethyl-4:4-phenyl-cyano-piperidinium bromide can be isolated from the suction-filtered crystal magma by treatment with alcohol in laminae of melting point 305–315° C. (with decomposition). By thermal decomposition of this substance or also of the crude crystal magma the 1-methyl-4:4-phenylcyano-piperidine described in Example 1 is obtained in good yield.

*Example 5*

6 parts of pulverized sodium in 80 parts by volume of toluene are converted into the phenyl sodium compound with 13.2 parts of cholorobenzene. 22 parts of α-(meta-methoxyphenyl)-γ-(dimethylamino)-butyric acid nitrile (yellowish oil of boiling point 184–186° C. under 14 mm. pressure, prepared from meta-methoxy-benzylcyanide, β-dimethylaminoethylchloride and sodium amide) in 30 parts by volume of toluene are added drop by drop. After stirring for 3 hours a yellow green precipitate has separated. 18.8 parts of ethylene-dibromide in 100 parts by volume of toluene are added in drops at +10° C. to maximally 40° C. and the whole is further stirred for 15 hours. By filtering off and washing with ether there are obtained 45 parts of a nearly white powder. This yields on distillation 12 mm. 270–350° C. (bath temperature) the 1-methyl-4:4-(meta-methoxyphenyl-cyano-piperidine as a yellowish oil of boiling point 196–197° C. under 12 mm. pressure which solidifies on standing and then melts at about 40° C., methylbromide being split off from the quaternary compound.

On heating this nitric with methanolic caustic soda solution to 190–200° C., there is obtained the 1-methyl-4-(meta-methoxyphenyl)-piperidine-4-carboxylic acid of melting point 322–323° C. (with decomposition) which yields the 1-methyl-4-(meta-methoxyphenyl) - piperidine-4-carboxylic acid ethylester on esterification with alcohol (oil of boiling point 195—197° C. under 12 mm. pressure). The hydrochloride of this ester melts at 175–176° C.

When heating the above 1-methyl-4-(meta-methoxyphenyl) - piperidine-4-carboxylic acid with glacial acetic hydrogen bromide, there is formed the 1-methyl-4-(meta-hydroxyphenyl)-piperidine-4-carboxylic acid (brownish needles of melting point 280–285° C.). On esterification the 1-methyl-4-(meta-hydroxyphenyl)-piperidine-4-carboxylic acid ethylester is obtained therefrom which yields a hydrochloride of melting point 166–167° C.

When saponifying the 1-methyl-4:4-(meta-methoxyphenyl)-cyano-piperidine under mild conditions with methyl alcohol caustic soda solution (2 hours at 160–170° C.), there is obtained the 1-methyl-4-(meta-methoxyphenyl)-piperidine-4-carboxylic acid amide in the form of crystals which melt at 133–135° C. with decomposition.

If 1 - methyl-4-meta-methoxyphenyl-4-cyano-piperidine is caused to react with Grignard compounds, the corresponding ketones are obtained. With n-propyl-magnesium bromide there can be obtained 1-methyl-4-(meta-methoxyphenyl)-piperidyl-(4)-n-propylketone (hydrochloride of melting point 125-127° C.), from which the 1-methyl-4-(meta - hydroxyphenyl)-piperidyl-4-n-propyl-ketone (a feebly yellowish oil) is obtained by boiling with hydrobromic acid. 1-methyl-4-(m-hydroxyphenyl)-piperidyl-(4) - ethyl-ketone hydrobromide of melting point 190-191° C. is obtained in a corresponding manner with ethylmagnesium bromide.

Example 6

When replacing in Example 1 the 52.8 parts of α-phenyl-γ-(methyl-benzyl-amino)-butyric acid-nitrile by 58.8 parts of α-(ortho-methoxyphenyl)-γ-(methyl-benzylamino)-butyric acid-nitrile (a thick oil of boiling point 165-166° C. under 0.06 mm. pressure, prepared from ortho-methoxy-benzylcyanide with β-chloroethyl-methyl- benzyl-amine in the presence of sodium amide), there is obtained the 1:1-methyl-benzyl-4:4-(ortho-methoxyphenyl)-cyano-piperidinium bromide in white crystals of melting point 203-204° C.

If this bromide is shaken in an aqueous alcoholic suspension with hydrogen and palladium, it takes up 1 mol of hydrogen and goes into solution. When filtering the solution to remove the palladium and concentrating, the hydro-bromide of the 1-methyl-4:4- (ortho-methoxy-phenyl)- cyano-piperidine crystallizes in large brilliant crystals of melting point 262-264° C. The free base forms in ether rather sparingly soluble laminae of melting point 98-99° C.

Example 7

A solution of 436 parts of α-(meta-methoxyphenyl)-γ-(dimethylamino)-butyric acid nitrile in 1000 parts by volume of ether is gradually added, while stirring, to a suspension of 100 parts of pulverized sodium amide in 2000 parts by volume of ether. The sodium amide enters into solution with evolution of ammonia, but the sodium compound of the α-(meta-methoxyphenyl-γ-(dimethylamino)-butyric acid nitrile is soon precipitated as a sandy crystal powder. In order to complete the reaction the whole is boiled for 1 hour under reflux. After cooling to 0° C. or slightly below 0° C. a solution of 470 parts of p-toluene sulfonic acid-β-chlorohydrin ester in 1000 parts by volume of ether is added in such a manner that the temperature does not exceed 0° C. After further stirring for ½ hour the whole is suction-filtered to remove the precipitated sodium-toluene sulfonate. The condensation product corresponding to the Formula IIa is found in the filtrate. Already on allowing this ether solution to stand gradual ring closure to the quaternary base occurs, i. e. to the 1:1-dimethyl - (meta - methoxy - phenyl) - 4 - cyano-piperidinium chloride, which is left behind as a hard, white crystal cake on evaporating the ether solution. It can be recrystallized from alcohol. When heating this salt to 230-250° C. under 12 mm. pressure, it is decomposed without melting, and the 1 - methyl - 4 - (m - methoxyphenyl) - 4 - cyano-piperidine described in Example 5 is distilled in theoretical yield which solidifies immediately.

By reacting 230 parts of this nitrile with a Grignard solution prepared from 25 parts of magnesium and the necessary quantity of bromomethyl, there is formed 1-methyl-4-(methoxyphenyl) - piperidyl - (4) - methylketone which is converted into the 1-methyl-4-(m-hydroxyphenyl)-piperidyl-(4)-methyl-ketone of melting point 158-159° C. by boiling with hydrobromic acid and subsequently treating with ammonia.

What we claim is:

1. In a process for the manufacture of a 4-aryl-piperidyl-(4)-alkyl-ketone, the step of reacting an α-arylated tertiary γ-amino-butyric acid nitrile of the formula

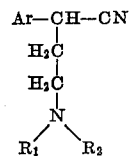

wherein Ar is a member selected from the group consisting of unsubstituted aryl and aryl substituted by alkoxy, $R_1$ is lower alkyl and $R_2$ is a member selected from the group consisting of lower alkyl and aralkyl, with an alkylene-1:2-diol ester of an organic sulfonic acid in the presence of a substance forming a metal compound of the said nitrile whereby a quaternary 4:4-aryl-cyano-piperidine is formed.

2. In a process for the manufacture of a 4-phenyl-piperidyl-(4)-alkyl-ketone the step of reacting a tertiary γ-amino-α-phenyl butyric acid nitrile of the formula

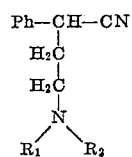

wherein Ph is a phenyl radical containing in at least one of the positions ortho and meta an alkoxy group, $R_1$ is lower alkyl and $R_2$ is a member selected from the group consisting of lower alkyl and aralkyl with an alkylene-1:2-diol ester of an organic sulfonic acid in the presence of a substance forming a metal compound of the said nitrile whereby a quaternary 4:4-alkoxy-penyl-cyano-piperidine is formed.

3. In a process for the manufacture of a 4-phenyl-piperidyl-(4)-alkyl-ketone, the step of reacting the sodium compound of α-(meta-methoxy-phenyl)-γ-(dimethylamino)-butyric acid nitrile of the formula

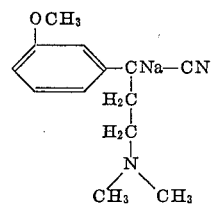

with the β-chloro-ethanol-γ-toluene-sulfonic acid ester whereby 1:1-dimethyl-4-(meta-methoxy-phenyl)-2-cyano-piperidinium chloride is formed.

4. A 1 - lower-alkyl-4-(meta - hydroxyphenyl) - piperidyl-(4)-alkyl-ketone of the formula

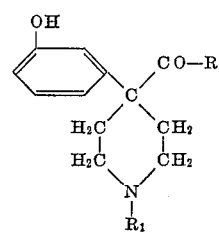

wherein each of R and $R_1$ represents a lower alkyl group.

5. 1-methyl-4-(meta-hydroxyphenyl)-piperidyl-(4)-methyl-ketone of the formula

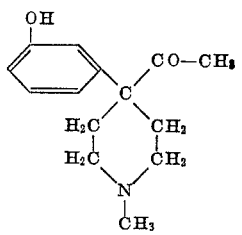

6. 1-methyl-4-(meta-hydroxyphenyl)-piperidyl-(4)-ethyl-ketone of the formula

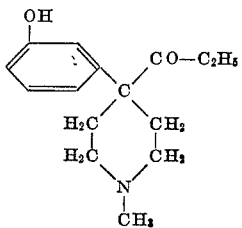

7. 1-methyl-4-(meta-hydroxyphenyl)-piperidyl-(4)-propyl-ketone of the formula

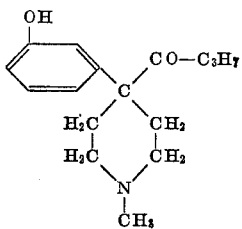

KARL MIESCHER.
HANS KAEGI.

REFERENCES CITED

The following references are of record in the file of this patent:

UNITED STATES PATENTS

| Number | Name | Date |
| --- | --- | --- |
| 2,167,351 | Eisleb | July 25, 1939 |
| 2,403,903 | Bergel et al. | July 16, 1946 |

FOREIGN PATENTS

| Number | Country | Date |
| --- | --- | --- |
| 501,135 | Great Britain | Feb. 21, 1939 |
| 218,517 | Switzerland | Apr. 1, 1942 |

OTHER REFERENCES

Koelsch, J. Am. Chem. Soc., 65, 2093–2095, 1943.
Chem. Soc. Journ, pages 261–269, 1944
Archiv. for Exp. Path. Pharm., 196, 127–129.

Certificate of Correction

November 1, 1949

Patent No. 2,486,794

KARL MIESCHER ET AL.

It is hereby certified that errors appear in the printed specification of the above numbered patent requiring correction as follows:

Column 1, line 26, for "α-phenyl-γ(dimethyl-" read *α-phenyl-γ-(dimethyl-*; column 6, line 2, for "β-dimethylaminoethel" read *β-dimethylaminoethyl*; line 36, before the numeral "12" insert an opening parenthesis; line 37, before the word "bath" strike out the opening parenthesis; line 38, after "methoxyphenyl" insert a closing parenthesis, line 43, for "nitric" read *nitrile*; column 8, line 43, for "penyl" read *phenyl*; and that the said Letters Patent should be read with these corrections therein that the same may conform to the record of the case in the Patent Office.

Signed and sealed this 28th day of March, A. D. 1950.

[SEAL]

THOMAS F. MURPHY,
*Assistant Commissioner of Patents.*